US011791985B2

(12) United States Patent
Koziol (10) Patent No.: US 11,791,985 B2
(45) Date of Patent: Oct. 17, 2023

(54) TRACKING, STORAGE AND AUTHENTICATION OF DOCUMENTED INTELLECTUAL PROPERTY

(71) Applicant: Jeffrey E. Koziol, Madison, WI (US)

(72) Inventor: Jeffrey E. Koziol, Madison, WI (US)

(*) Notice: Subject to any disclaimer, the term of this patent is extended or adjusted under 35 U.S.C. 154(b) by 480 days.

(21) Appl. No.: 16/888,569

(22) Filed: May 29, 2020

(65) Prior Publication Data

US 2020/0382284 A1 Dec. 3, 2020

Related U.S. Application Data

(60) Provisional application No. 62/854,471, filed on May 30, 2019.

(51) Int. Cl.
*H04L 29/06* (2006.01)
*H04L 9/06* (2006.01)
*G06Q 20/36* (2012.01)
*H04L 9/32* (2006.01)
*G06Q 50/18* (2012.01)
*G06F 16/13* (2019.01)

(52) U.S. Cl.
CPC .......... *H04L 9/0643* (2013.01); *G06F 16/137* (2019.01); *G06Q 20/3672* (2013.01); *G06Q 50/184* (2013.01); *H04L 9/0637* (2013.01); *H04L 9/3297* (2013.01)

(58) Field of Classification Search
CPC ... H04L 9/0643; H04L 9/0637; H04L 9/3297; H04L 9/3239; H04L 9/3247; H04L 9/50; H04L 63/123; G06F 16/137; G06F 16/325; G06Q 20/3672; G06Q 50/184; G06Q 2220/00; G06Q 20/02; G06Q 20/401
See application file for complete search history.

(56) References Cited

U.S. PATENT DOCUMENTS

| 10,915,891 | B1* | 2/2021 | Winklevoss | .......... H04L 9/3255 |
| 2016/0283920 | A1* | 9/2016 | Fisher | .................. G06Q 20/065 |
| 2019/0361917 | A1* | 11/2019 | Tran | ..................... G06Q 20/308 |
| 2020/0119904 | A1* | 4/2020 | Philyaw | ................ H04L 63/105 |
| 2020/0382284 | A1* | 12/2020 | Koziol | .................. H04L 63/123 |

FOREIGN PATENT DOCUMENTS

WO   WO-2019159172 A1 * 8/2019 ............. G06F 21/57

* cited by examiner

*Primary Examiner* — Mahfuzur Rahman
(74) *Attorney, Agent, or Firm* — Dickinson Wright PLLC (57) ABSTRACT

Systems and methods are provided including an implementation where a written new idea is reduced to a document, such as a patent application, which can be put through a secure hash algorithm to create a hash of the entire document, or at least a portion thereof. A time stamp is applied to the hash by posting the hash to a website and/or using time stamp hardware having an authentication capability.

4 Claims, 8 Drawing Sheets

TRACKING, STORAGE AND AUTHENTICATION OF DOCUMENTED INTELLECTUAL PROPERTY

This application claims priority to prior U.S. Provisional Patent Application No. 62/854,471, filed May 30, 2019, the entire contents of which is incorporated herein by reference.

BACKGROUND OF THE DISCLOSURE

1. Field of Disclosure

Generally, exemplary embodiments of the present disclosure relate to the field of document authentication and tracking including date of document creation and modification/additions, and authorship of original document and/or any modifications/additions. Exemplary implementations of certain embodiments of the present disclosure provide systems and methods for encryption of at least a portion, or an entire, document and/or any modifications/additions thereto, including time stamp and authorship information associated with the document and/or any modifications/additions thereto, and secure storage and retrieval thereof, utilizing blockchain-stored hash methodologies and hardware storing the required data and executing the required computer-readable instructions.

2. Discussion of the Background of the Disclosure

Conventionally, a document or its hash can be permanently stored on a blockchain such that the data cannot be changes once it is included a block such that the document can be permanently visible. A blockchain can be a private blockchain if it is desirable to limit access to the document offering permanent visibility only to a preselected group. One of the advantages of using blockchain is decentralization where uploading the document or its hash to a blockchain can address concerns associated with a third-party storage provider tampering with or deleting the document.

A document can be stored on the blockchain by storing the entire document itself on-chain, or storing only a hash of the document on the blockchain.

Storing a whole document on-chain require handling of very large amount of data, unless it is a very small file. For example, to address such large data demands, storing a document on Bitcoin, required compression and formatting of the document into a hexadecimal form. However, storage of the whole documents on a blockchain may be appropriate if access latency (the length of time it takes a user to upload and download the document) is not a concern. Fully decentralized public blockchains can have thousands of nodes to ensure authentication and tamper-proofing the documents, but results in a corresponding increase in latency which can cause the system to become slow and expensive to use.

An optional approach that addresses the storage requirement issue provides for storing only a part of the document and the document hash on-chain, which still allows decentralization and full transparency of a more critical part of a document, such as authorship (for example, by storing only a signature block of a document on-chain).

Another conventional approach for document storage is to store only a document's hash on-chain while storing the whole document, for example in another database or on a distributed file storage system. A document can be put through a secure hash algorithm, for example SHA-1 or SHA-256, and then store the hash in a block. This provides for significant reduction in storage requirements, access latency and cost because hash values are much smaller than the whole documents. On the other hand, all the tracking and authentication advantages of a blockchain are still available because any change in the input would result in a new hash value, different from the original document, such that any changes/modification to the original document intentional and/or unintentional can be easily detected and tracked. Multiple documents can also be stored, for example by putting the respective hashes of the documents into a distributed hash table, which is stored on-chain.

All of the conventional approaches do not provide a uniform solution to the need of secure document storage and visibility that also provides for tracking and authentication of the original documents as well as any subsequent changes and/or modifications to the original document including authorship and time stamp of any such changes and/or modifications.

SUMMARY OF THE DISCLOSURE

Exemplary embodiments of the present disclosure address at least such drawbacks by providing systems and methods including an implementation where a written new idea is reduced to a document, such as a patent application, which can be put through a secure hash algorithm to create a hash of the entire document, or at least a portion thereof. A time stamp is applied to the hash by posting the hash to a website and/or using time stamp hardware having an authentication capability.

An exemplary embodiments of the present disclosure combines a time stamp and a hash of a document, or a portion thereof, to create a time-stamped hash of the document, or a portion thereof, which can be posted on a new blockchain independent of any other blockchain, which may have been used or referenced to create and/or store the document, or its hash, or which may have been used or referenced to create the time stamp.

According to another exemplary embodiment of the present disclosure, a hash of a document, or at least a portion thereof, and its time stamp are hashed to create a time-stamped document hash, or TSDH, of the document, or at least a portion thereof, and its time stamp.

According to an exemplary implementation, TSDH can be posted on a new blockchain, which is independent of any other blockchain.

According to yet another exemplary embodiment of the present disclosure, written new ideas can be reduced to respective multiple documents, each of which can be put through a secure hash algorithm to create a hash of each document, or at least a portion thereof. A respective time stamp can be applied to a hash of each document, for example by posting the hash to a website and/or using time stamp hardware having an authentication capability.

According to an exemplary implementation of the present disclosure, time stamp and hash or each respective document, or a portion thereof, are combined to create a time-stamped hash of each document, or a portion thereof, which can be posted as respective blocks of a new blockchain which is independent of any other blockchain.

In yet further exemplary implementations of the embodiments of the present disclosure, written new ideas are reduced sequentially and/or in parallel as portions of a document, for example as parts of a patent applications. One or more of the parts, can be put through a secure hash algorithm to create a hash of the entire part, or at least a portion thereof. A time stamp can be applied to the hash, for example by posting the hash to a website and/or using time stamp hardware having an authentication capability.

According to an exemplary implementation of the present disclosure, time stamp and hash of a document part are combined to create a time-stamped hash of the part, or a portion thereof, which can be posted as a block of a new blockchain which is independent of any other blockchain.

According to yet another exemplary implementation, hash of a part of a document and its time stamp are hashed to create a TSDH of the part and its time stamp. The TSDH can be posted as a blocks of a new blockchain which is independent of any other blockchain.

In still yet further exemplary implementations of the embodiments of the present disclosure, new ideas are reduced sequentially and/or in parallel as parts of a document where one or more of the parts can include one or more associated signatures, for example of the author or authors of that part. One or more of the stored parts including respective signature blocks can be put through a secure hash algorithm to create a hash of the part and hash of the signature associated with the part.

In an exemplary implementation, a hash of the part and the hash 608 of its associated signature can form a signed hash, and a time stamp can be applied to the signed hash, for example by posting the signed hash to a website and/or using time stamp hardware having an authentication capability. Time stamp and signed hash can be combined to create a time-stamped signed hash of the part, such that the time-stamped signed hash can be posted as a blocks of a new blockchain which is independent of any other blockchain.

According to yet another exemplary implementation, hash of a part of the documents can be created such that signed hash of the part and time stamp associated with the part are hashed to create a signed TSDH of the part, which can be posted as a block of a new blockchain.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION OF EXEMPLARY EMBODIMENTS

The matters exemplified in this description are provided to assist in a comprehensive understanding of exemplary embodiments of the disclosure. Accordingly, those of ordinary skill in the art will recognize that various changes and modifications of the embodiments described herein can be made without departing from the scope and spirit of the described disclosure. Also, descriptions of well-known functions and constructions are omitted for clarity and conciseness.

Figure 1:
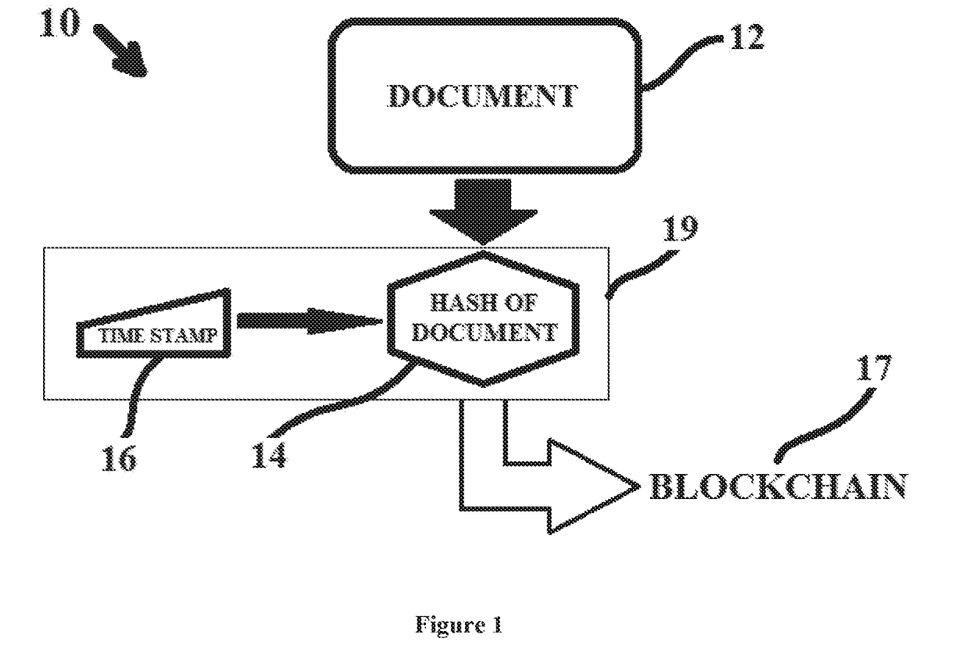
FIG. 1 is an illustrative conceptual diagram showing diagrammatic representation of a methodology according to an exemplary implementation of exemplary embodiments of the present disclosure.
Figure 2:
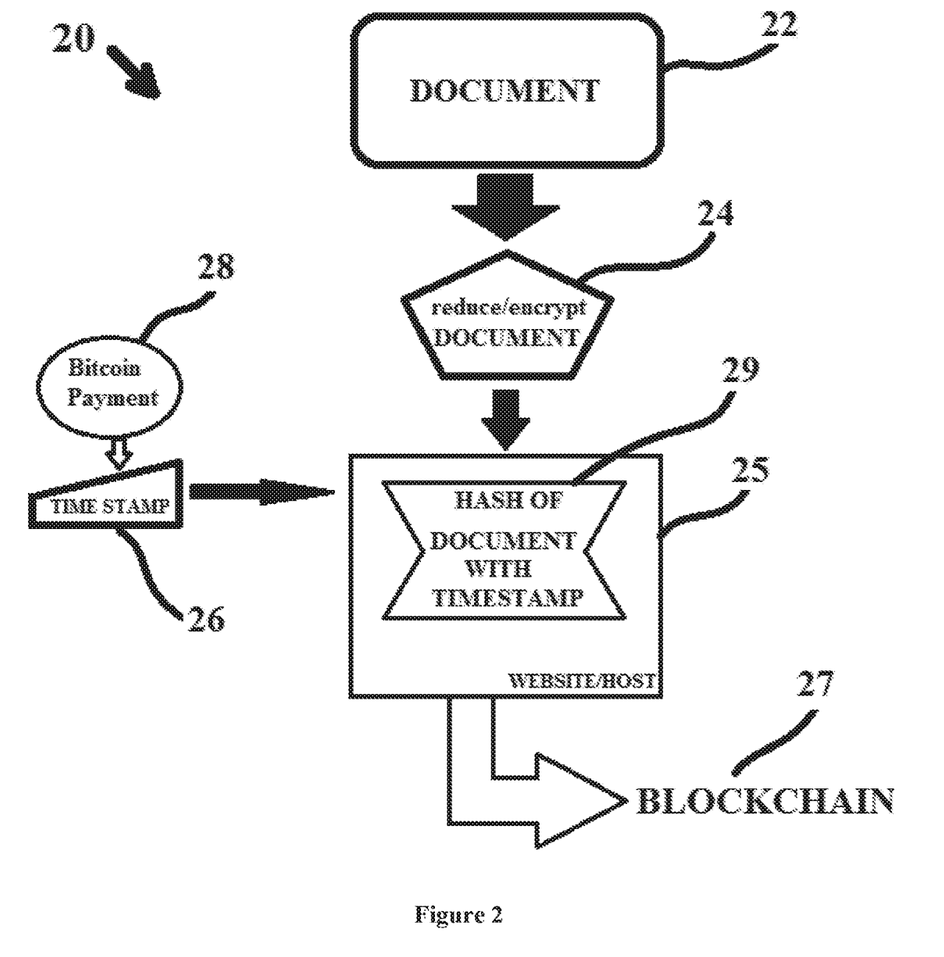
FIG. 2 is an illustrative conceptual diagram showing diagrammatic representation of a methodology according to an alternative exemplary implementation of exemplary embodiments of the present disclosure.
Figure 3:
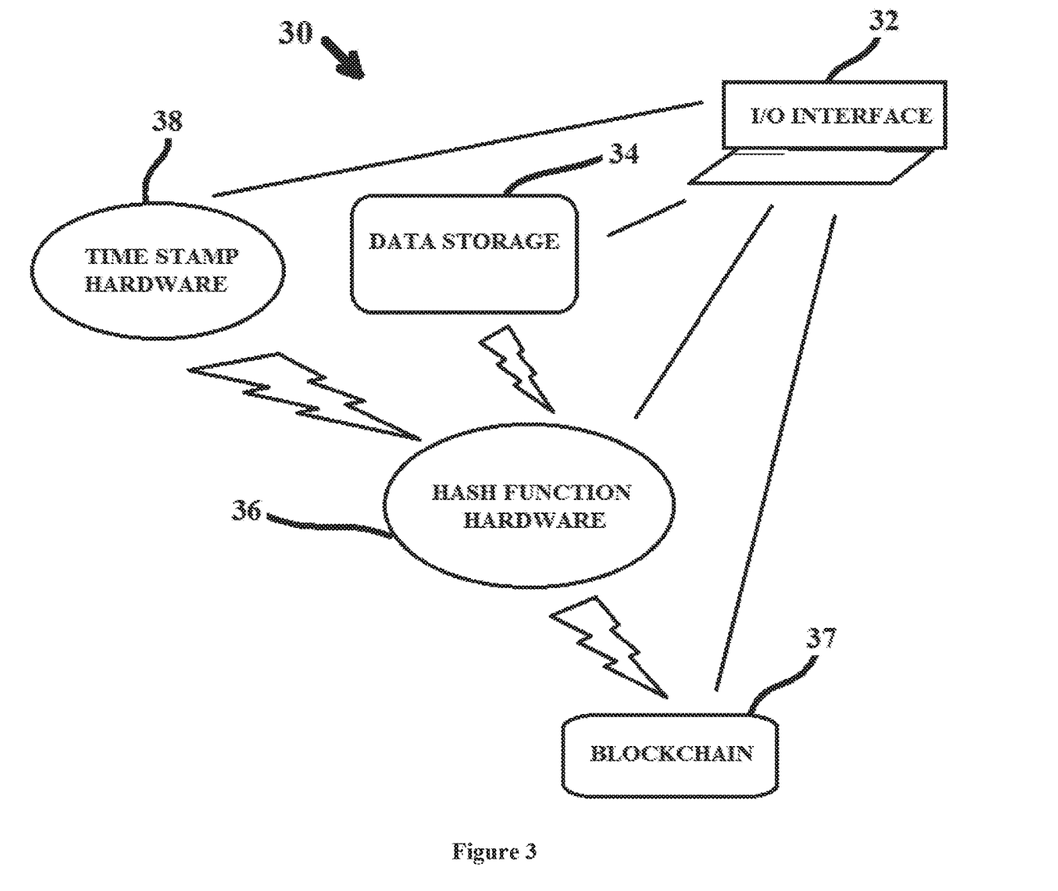
FIG. 3 is an illustrative conceptual diagram showing diagrammatic representation of a system including hardware components thereof according to an exemplary implementation of exemplary embodiments of the present disclosure uniquely configured to execute on or more methodologies of the present disclosure.

Referring to an example of FIGS. 1, 2 and 3, exemplary implementations of embodiments of the present disclosure provide a system 30 and methodology 10, 20 where a written new idea is reduced to a documents 12, 22, for example via a user interface 32 and stored, for example as a patent application in a data storage 34. The stored document 12, 22 is put through a secure hash algorithm, for example SHA-1 or SHA-256 implemented in a hash function hardware 36, to create a hash 14, 24 of the entire document 12, 22, or at least a portion thereof. A time stamp 16, 26 is applied to the hash 14, 24, for example by posting the hash to a website 28 and/or using time stamp hardware 38 having an authentication capability.

In an exemplary implementation illustrated in FIG. 2, a document 22 containing a written new idea, or at least a portion of the document, is reduced or encrypted, for example by a hash function hardware 35 to create a hash 24 of the document or a portion thereof. A time stamp 26 associated with the document 22 or a portion thereof is created, for example by posting the document 22 or a portion thereof to a website or a host via a bitcoin transaction 28 or by other authenticated time stamp hardware 38. For a document 22 containing a new idea, such as a patent application, the time stamp 26 is critical as a proof of the priority date.

Referring further to FIGS. 1 and 3, according to an exemplary implementation, time stamp 16 and hash 14 are combined to create a time-stamped hash 19 of document 12, or a portion thereof. Time-stamped hash 19 can be posted on a new blockchain 17, 37 which is independent of any other blockchain, which may have been used or referenced to create and/or store the document 12, or a portion thereof, or its hash 14, or which may have been used or referenced to create time stamp 16.

The creation of a hash 19 and its posting to a new blockchain 17 provides a more uniform and independent system and process for authentication of documents and their associated time stamps, particularly documents containing written new ideas, such as patent applications, critically dependent on the time stamp and authorship authentication Referring further to FIGS. 2 and 3, according to another exemplary implementation, hash 24 of the document 22, or at least a portion thereof, and time stamp 26 are hashed to create a hash 29 of the document 22, or at least a portion thereof, and its time stamp 26. Hash 29 can be referred to (not by way of limitation, but simply for ease of reference) as a time-stamped document hash, or TSDH, 29, residing at least temporarily on a website or a host 25 employed or referenced to create TSDH 29. In a further exemplary implementation, TSDH 29 is posted on a new blockchain 27, 37, which is independent of any other blockchain, such blockchain associated with Bitcoin, which may have been used or referenced to create and/or store the document 22, or a portion thereof, or its hash 24, prior to it being time stamped, or which may have been used or referenced to create its time stamp 26.

The creation of a TSDH 29 and its posting to a new blockchain 27 provides an even more uniform and independent system and process for authentication of documents and their associated time stamps, particularly documents containing written new ideas, such as patent applications, critically dependent on the time stamp and authorship authentication.

In an exemplary implementation, the new blockchain 17, 27, 37 can be a private blockchain to ensure secure and only authorized access, while providing transparency to members of the private blockchain. For example, a patent office, such as a U.S. Patent and Trademark Office, can be a member of such a new private blockchain, to be able to access and authenticate the date and authorship of a patent application.

Referring further to FIGS. 2 and 3, according to another exemplary implementation, hash 24 of the document 22, or at least a portion thereof, and time stamp 26 are hashed to create a hash 29 of the document 22, or at least a portion thereof, and its time stamp 26. Hash 29 can be referred to (not by way of limitation, but simply for ease of reference) as a time-stamped document hash, or TSDH, 29, residing at least temporarily on a website or a host 25 employed or referenced to create TSDH 29. In a further exemplary implementation, TSDH 29 is posted on a new blockchain 27, 37, which is independent of any other blockchain, such blockchain associated with Bitcoin, which may have been used or referenced to create and/or store the document 22, or a portion thereof, or its hash 24, prior to it being time stamped, or which may have been used or referenced to create its time stamp 26.

Figure 4:
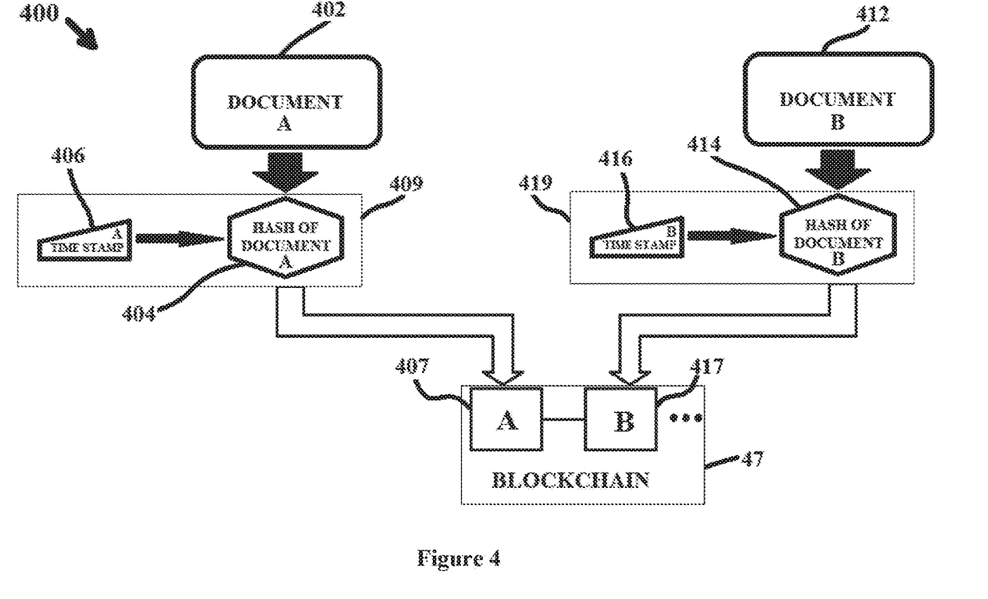
FIG. 4 is an illustrative conceptual diagram showing diagrammatic representation of a methodology according to another exemplary implementation of exemplary embodiments of the present disclosure.

Referring to FIG. 4, according to yet another exemplary implementation of the disclosure, methodology 400, which can be implemented for example on a system 30, where written new ideas are reduced to respective multiple documents, such as document A 402 and document B 412, for example via one or more user interfaces, such as interface 32 and stored, for example as a patent applications in the same or different data storage, such as data storage 34. Each of the stored documents A 402 and B 412 is put through a secure hash algorithm, for example SHA-1 or SHA-256 implemented in a hash function hardware 36, to create a hash A 404 of the entire document A 402, or at least a portion thereof, and hash B 414 of the entire document B 412, or at least a portion thereof. A time stamp A 406 is applied to the hash A 404 and time stamp B 416 is applied to the hash B 414, for example by posting the hash to a website, such as website 28 as explained in the example of FIG. 2, and/or using time stamp hardware, such as hardware 38, having an authentication capability.

According to an exemplary implementation, time stamp A 406 and hash A 404 are combined to create a time-stamped hash 409 of document A 402, or a portion thereof. Likewise, time stamp B 416 and hash B 414 are combined to create a time-stamped hash 419 of document B 412, or a portion thereof. Time-stamped hash 409 and time-stamped hash 419 can be posted as blocks 407 and 417, respectively of a new blockchain 47 which is independent of any other blockchain, which may have been used or referenced to create and/or store either of the documents A 402 or B 412, or a portion thereof, or hash A 404 or B 414, prior to it being time stamped, or which may have been used or referenced to create the respective time stamp A 406 or B 416.

According to yet another exemplary implementation, hash 409 can be created by the methodology 20 described above with reference to FIG. 2, such that hash A 404 of the document A 402, or at least a portion thereof, and time stamp A 406 are hashed to create a time-stamped document hash, or TSDH, 409 of the document A 402, or at least a portion thereof, and its time stamp A 406. Likewise, hash 419 can be created by the methodology 20 described above with reference to FIG. 2, such that hash B 414 of the document B 412, or at least a portion thereof, and time stamp B 416 are hashed to create a time-stamped document hash, or TSDH, 419 of the document B 412, or at least a portion thereof, and its time stamp B 416.

Figure 5:
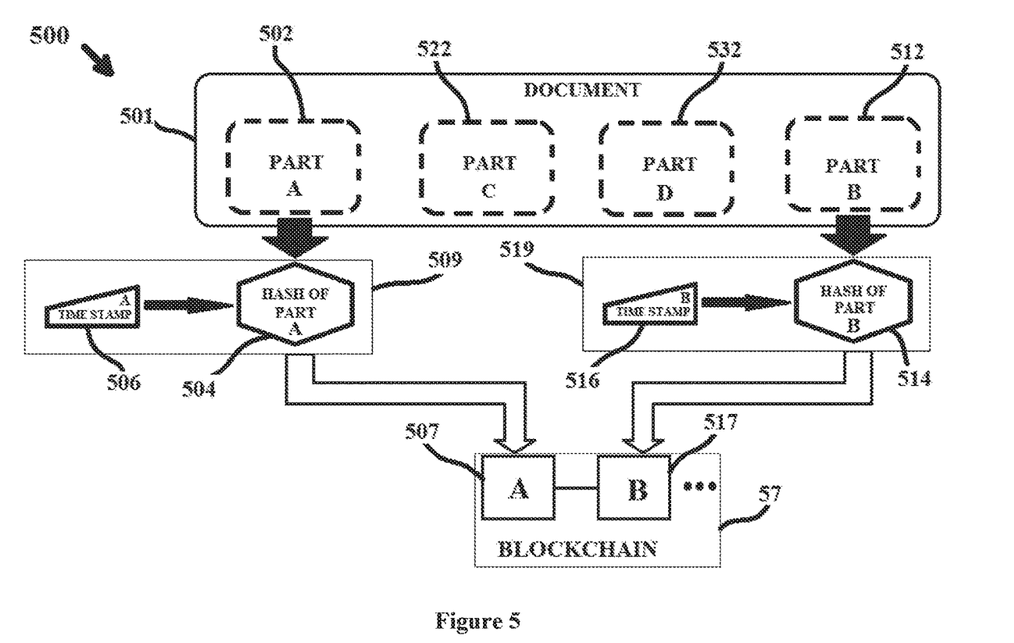
FIG. 5 is an illustrative conceptual diagram showing diagrammatic representation of a methodology according to yet another exemplary implementation of exemplary embodiments of the present disclosure.

Referring to FIG. 5, according to yet another exemplary implementation of the disclosure, methodology 500, which can be implemented for example on a system 30, where written new ideas are reduced sequentially and/or in parallel as portions, for example such as parts A 502, B 512, C 522, and D 532, of a document 501, for example via one or more user interfaces, such as interface 32 and stored, for example as parts of a patent applications in the same or different data storage, such as data storage 34. One or more of the stored parts, such as parts A 502 and B 512 of the present example, is/are put through a secure hash algorithm, for example SHA-1 or SHA-256 implemented in a hash function hardware 36, to create a hash A 504 of the entire part A 502, or at least a portion thereof, and hash B 514 of the entire part B 512, or at least a portion thereof. A time stamp A 506 is applied to the hash A 504 and time stamp B 516 is applied to the hash B 514, for example by posting the hash to a website, such as website 28 as explained in the example of FIG. 2, and/or using time stamp hardware, such as hardware 38, having an authentication capability.

According to an exemplary implementation, time stamp A 506 and hash A 504 are combined to create a time-stamped hash 509 of part A 502, or a portion thereof. Likewise, time stamp B 516 and hash B 514 are combined to create a time-stamped hash 519 of part B 512, or a portion thereof. Time-stamped hash 509 and time-stamped hash 519 can be posted as blocks 507 and 517, respectively of a new blockchain 57 which is independent of any other blockchain, which may have been used or referenced to create and/or store either document 501, or any portion, such as part A 502, B 512, C 522, or D 532 of document 501, or a portion thereof, or hash A 504 or B 514, prior to it being time stamped, or which may have been used or referenced to create the respective time stamp A 506 or B 516.

According to yet another exemplary implementation, hash 509 can be created by the methodology 20 described above with reference to FIG. 2, such that hash A 504 of the part A 502, or at least a portion thereof, and time stamp A 506 are hashed to create a time-stamped document hash, or TSDH, 509 of the part A 502, or at least a portion thereof, and its time stamp B 506. Likewise, hash 519 can be created by the methodology 20 described above with reference to FIG. 2, such that hash B 514 of the part B 512, or at least a portion thereof, and time stamp B 516 are hashed to create a time-stamped document hash, or TSDH, 519 of the part B 512, or at least a portion thereof, and its time stamp B 516. TSDH 509 and TSDH 519 can be posted as blocks 507 and 517, respectively of a new blockchain 57.

Figure 6:
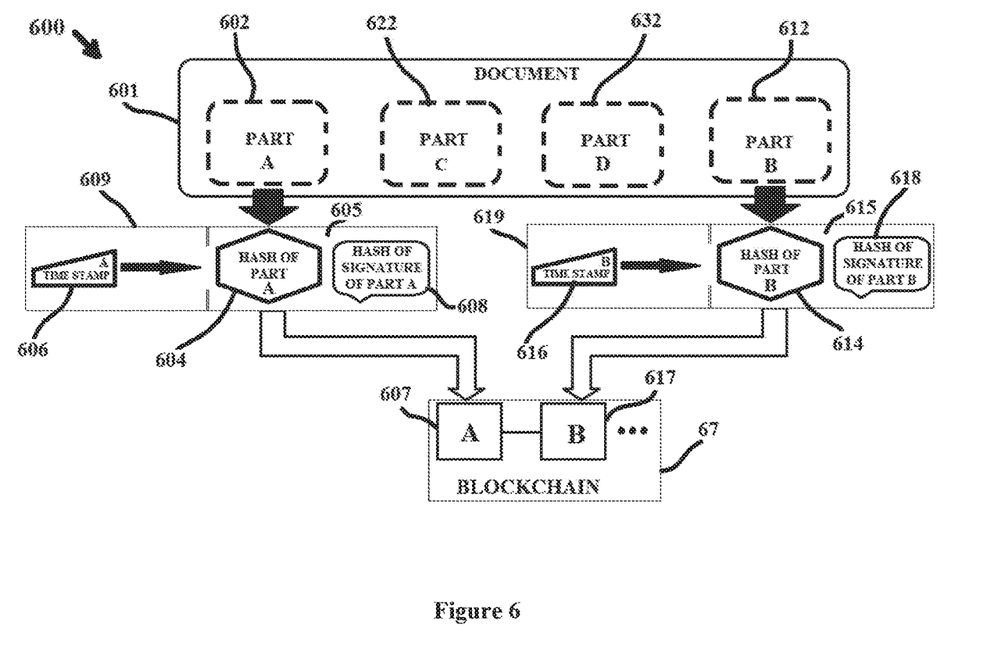
FIG. 6 is an illustrative conceptual diagram showing diagrammatic representation of a methodology according to still another exemplary implementation of exemplary embodiments of the present disclosure.

Referring to FIG. 6, according to yet another exemplary implementation of the disclosure, methodology 600, which can be implemented for example on a system 30, where written new ideas are reduced sequentially and/or in parallel as portions, for example such as parts A 602, B 612, C 622, and D 632, of a document 601, for example via one or more user interfaces, such as interface 32 and stored, for example as parts of a patent applications in the same or different data storage, such as data storage 34.

In an exemplary implementation, one or more of the stored parts, such as parts A 602 and B 612 of the present example can include associated signatures, for example of the author or authors of that portion of an inventive concept. One or more of the stored parts, such as parts A 602 and B 612, including respective signature blocks, of the present example, is/are put through a secure hash algorithm, for example SHA-1 or SHA-256 implemented in a hash function hardware 36, to create a hash A 604 of the entire part A 602, or at least a portion thereof, and hash 608 of signature of part A 602, and hash B 614 of the entire part B 612, or at least a portion thereof, hash 618 of signature of part B 612.

In an exemplary implementation, hash A 604 can be associated with a hash 608 of signature of part A 602 to form a signed hash 605, and time stamp A 606 can be applied to the signed hash A 605, for example by posting the hash to a website, such as website 28 as explained in the example of FIG. 2, and/or using time stamp hardware, such as hardware 38, having an authentication capability. Likewise, hash B 614 can be associated with a hash 618 of signature of part B 612 to form a signed hash 615, and time stamp B 616 can be applied to the signed hash B 615, for example by posting the hash to a website, such as website 28 as explained in the example of FIG. 2, and/or using time stamp hardware, such as hardware 38, having an authentication capability According to an exemplary implementation, time stamp A 606 and signed hash 605 are combined to create a time-stamped signed hash 609 of part A 602, or a portion thereof. Likewise, time stamp B 616 and signed hash 615 are combined to create a time-stamped signed hash 619 of part B 612, or a portion thereof. Time-stamped signed hash 609 and time-stamped signed hash 619 can be posted as blocks 607 and 617, respectively of a new blockchain 67 which is independent of any other blockchain, which may have been used or referenced to create and/or store either document 601, or any portion, such as part A 602, B 612, C 622, or D 632 of document 601, or a portion thereof, or signed hash 605 or signed hash 615, prior to it being time stamped, or which may have been used or referenced to create the respective time stamp A 606 or B 616.

According to yet another exemplary implementation, hash 609 can be created by the methodology 20 described above with reference to FIG. 2, such that signed hash 605 of the part A 602, or at least a portion thereof, and time stamp A 606 are hashed to create a signed time-stamped document hash, or signed TSDH, 609 of the part A 602, or at least a portion thereof, its signature part A 608, and its time stamp B 606. Likewise, hash 619 can be created by the methodology 20 described above with reference to FIG. 2, such that hash B 614 of the part B 612, or at least a portion thereof, its signature part B 618, and its time stamp B 616 are hashed to create a signed time-stamped document hash, or TSDH, 619 of the part B 612, or at least a portion thereof, its signature part B 618, and its time stamp B 616. Signed TSDH 609 and signed TSDH 619 can be posted as blocks 607 and 617, respectively of a new blockchain 67.

Figure 7:
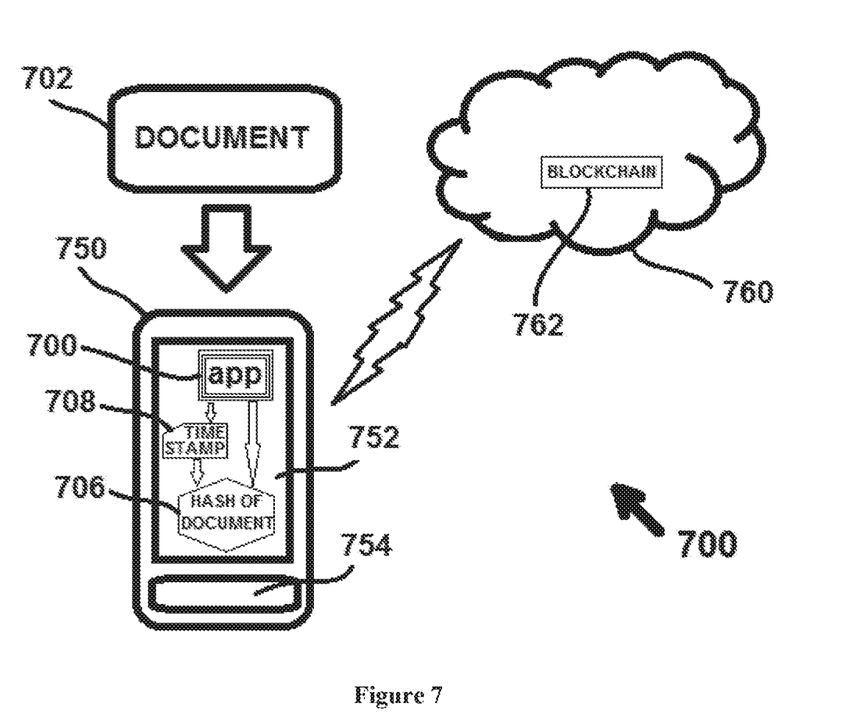
FIG. 7 is an illustrative conceptual diagram showing diagrammatic representation of a system including hardware components thereof according to another exemplary implementation of exemplary embodiments of the present disclosure uniquely configured to execute on or more methodologies of the present disclosure.

Referring to FIG. 7, according to yet another exemplary embodiment of the disclosure, in a system or methodology 700, a document authentication app 700 can be provided on a personal computing and/or communication device 750 such as smart phone. In an exemplary implementation, a document 702 can be dragged (or input, or imported) into the app 700, for example via a photo of a document 702 taken by a camera provided in the smart phone 750 and/or via a text and/or via an email and/or via another app, and receive or generate a hash 706 of this document 702. For example, app 700 would be activated, either by a user (for example, via a GUI 752 or other user interface 754), or automatically upon receipt of a document 702, and when receiving a document 702, execute a command for a transaction and incorporate the data(hash) 706 in a blockchain and time, or time stamp 708, of incorporation. In an exemplary implementation, app 702 can be running and/or accessing an open-source, public, blockchain-based distributed computing platform and operating system 760 featuring smart contract (scripting) functionality, such ethereum (which supports a modified version of Nakamoto consensus via transaction-based state transitions) created by Ethereum Foundation. In yet further exemplary implementation, hash 706 can be stored on an ethereum-type blockchain 762.

Figure 8:
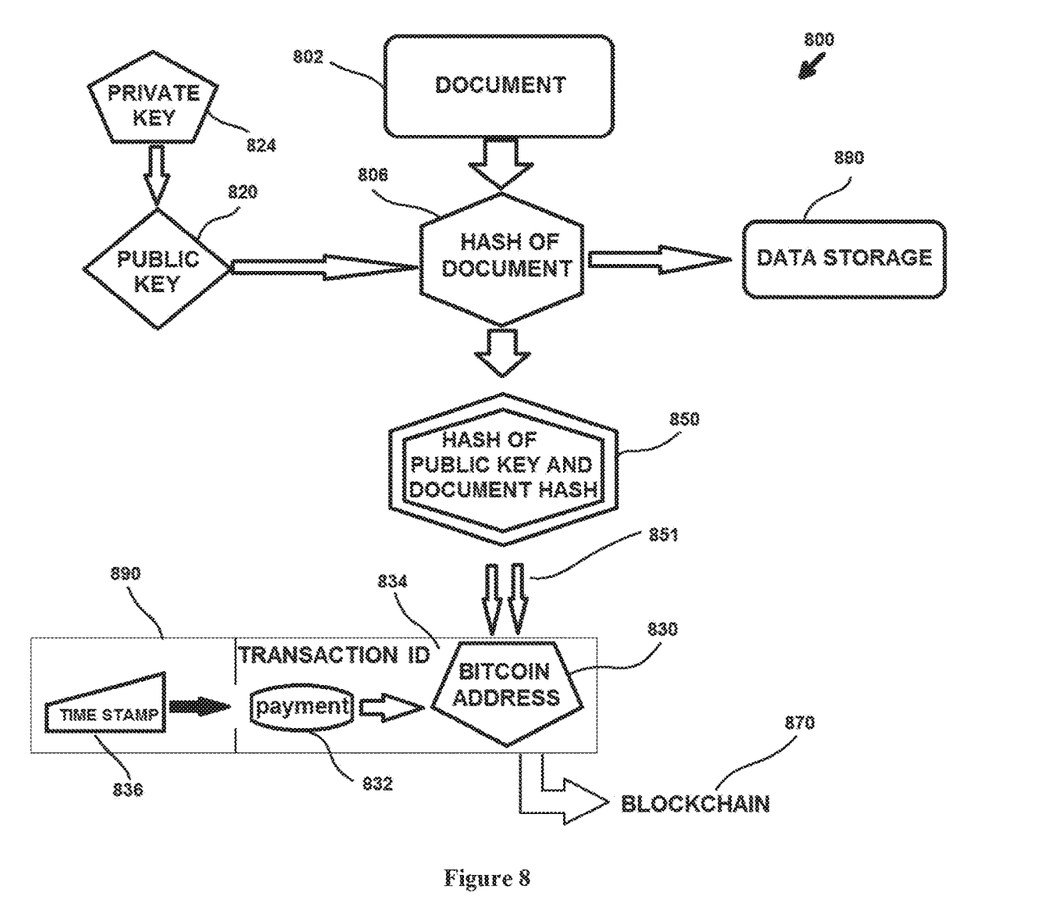
FIG. 8 is an illustrative conceptual diagram showing diagrammatic representation of a methodology according to still yet another exemplary implementation of exemplary embodiments of the present disclosure.

Referring to FIG. 8, according to yet another exemplary embodiment of the disclosure, in a system or methodology 800, a hash of a document, such as intellectual property data, can be added to an authenticated address, such as a bitcoin address, to time stamp and/or authenticate and/or identify a document, a transaction, and/or intellectual property (IP), 802 as follows.

A public key 820 can be obtained from a corresponding private key 824. A hash 806 of document 802 can be obtained, for example by SHA 256 algorithm or any other suitable encoding method. Then, hash 806 comprising a resultant numeric and/or alphanumeric representation of document 802 is combined with the public key 820 and hashed to obtain a hash 850 of public key and document hash. A sequence of hash functions 851, or application of encoding algorithms, is then continued to create a bitcoin address 830 using hash 850 which would result in a bitcoin address 830 having hash 806 of document 802 added thereto. In yet further exemplary implementation, a small payment 832 can made to bitcoin address 830, which can result in a transaction ID 834, which can be time stamped 836 when incorporated 890 and can be posted on blockchain 870. In still further exemplary implementation, ID 834 can be searched for on blockchain 870.

In an exemplary implementation, bitcoin address 830 would have no private key. In such a case, for example, money sent in small payment 832 would not be recovered.

In still further exemplary implementation, an owner of the document 802 can verify the date by re-hashing the original document 802 and coming up with Bitcoin address 830 or public key 820. For example, blockchain 870 can be used for absolute verification of a time sequence, for example accurate to about 10-15 minutes.

In still another exemplary implementation, when the document 802 is first hashed, hash 806 can be stored in a data storage 880. For example, data storage 880 can be a standard data base (i.e., does not heed to be of a blockchain-type), such that for multiple documents, and/or multiple authors of multiple documents, and/or multiple authors of multiple portions of one or more documents, each author's hashes and time sequence of his/her IP can be listed in the data storage 880.

In the above-described exemplary embodiments, a document can include one or more, and in any combination, e-mail, e-transactions, data elements and/or photos and/or images and/or photos of written notes or prototypes and/or any types of visual files and/or electronic versions of audio files, which can, but are not in themselves are required to, have a hash function and/or can be subject to a hash function and/or any encryption.

The above-described exemplary embodiments may be recorded in computer-readable media including program instructions to implement various operations embodied by a computer. The media may also include, alone or in combination with the program instructions, data files, data structures, and the like. The media and program instructions may be those specially designed and constructed for the purposes of the present disclosure, or they may be of the kind well-known and available to those having skill in the computer software arts. Examples of computer-readable media include magnetic media such as hard disks, floppy disks, and magnetic tape; optical media such as CD-ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and so on, including a carrier wave transmitting signals specifying the program instructions, data structures, and so on. Examples of program instructions include both machine code, such as produced by a compiler, and files containing higher level code that may be executed by the computer using an interpreter. The described hardware devices may be configured to act as one or more software modules in order to perform the operations of the above-described embodiments of the present disclosure. The described hardware devices may be in wired and/or wireless communication with each other and/or other devices as may be required to perform described methodologies and achieve described advantages.

While the present disclosure has been shown and described with reference to certain exemplary embodiments thereof, it will be understood by those skilled in the art that various changes in form and details may be made therein without departing from the spirit and scope of the present disclosure.

In addition, the drawing figures that follow further describe non-limiting examples of implementations of certain exemplary embodiments of the present disclosure and aid in the description of technology associated therewith.

Other objects, advantages and salient features of the disclosure will become apparent to those skilled in the art from the details provided, which, taken in conjunction with the annexed drawing figures, disclose exemplary embodiments of the disclosure.

The invention claimed is:

1. A method of storing documents comprising:
creating a first hash of a first part of a document, or at least a portion of the first part;
creating a first signature hash of a signature associated with the first part of the document, or at least a portion of the first part;
forming a first signed hash by combining the first hash and the first signature hash;
applying a first time stamp to the first signed hash by posting the first signed hash to a website and/or using time stamp hardware having an authentication capability;
combining the first time stamp and the first signed hash to create a first signed time-stamped hash of the first part;
creating a second hash of a second part of the document, or at least a portion of the second part;
creating a second signature hash of a signature associated with the second part of the document, or at least a portion of the second part;
forming a second signed hash by combining the second hash and the second signature hash;
applying a second time stamp to the second signed hash by posting the second signed hash to a website and/or using time stamp hardware having an authentication capability;
combining the second time stamp and the second signed hash to create a second signed time-stamped hash of the second part; and
posting the first signed time-stamped hash and the second signed time-stamped hash as respective blocks on a new blockchain,
wherein at least one of the first signed hash and the first time stamp are hashed to create a first signed time-stamped document hash (TSDH) of the first part of the document and the first time stamp, and the first signed TSDH is posted on the new blockchain.

2. The method of claim 1, wherein the new blockchain is independent of any other blockchain, which has been used or referenced to create and/or store the document, or the hash, or which has been used or referenced to create the time stamp.

3. The method of claim 1, further comprising storing the first hash of the document and/or second hash of the document in a data storage,
wherein the data storage comprises a listing of hashes and time sequence of: one or more documents, each of the documents having one or more authors; and/or one or more portions of one or more documents, each of the portions having one or more authors.

4. The method of claim 1, wherein the document comprises at least one of: data elements; and/or photographs; and/or images, and/or photographs of written notes and/or prototypes, and/or one or more visual representations and or electronic audio representations and/or files.

* * * * *